United States Patent [19]

Schott

[11] Patent Number: 5,582,220
[45] Date of Patent: Dec. 10, 1996

[54] APPARATUS FOR TRANSPORTING CONTAINERS INTERMITTENTLY

[75] Inventor: Helmut Schott, Satteldorf, Germany

[73] Assignee: Robert Bosch GmbH, Stuttgart, Germany

[21] Appl. No.: 373,319

[22] PCT Filed: Jun. 10, 1994

[86] PCT No.: PCT/DE94/00649

§ 371 Date: Mar. 20, 1995

§ 102(e) Date: Mar. 20, 1995

[87] PCT Pub. No.: WO95/00397

PCT Pub. Date: Jan. 5, 1995

[30] Foreign Application Priority Data

Jun. 21, 1993 [DE] Germany ............ 43 20 477.5

[51] Int. Cl.$^6$ ............................................. B65B 43/56
[52] U.S. Cl. .................... 141/168; 141/129; 141/177; 141/84
[58] Field of Search ........................... 141/129, 165, 141/168, 171, 177, 84; 198/347.1, 347.2, 465.1, 465.3, 803.2, 803.14, 803.15

[56] References Cited

U.S. PATENT DOCUMENTS

| 798,244 | 8/1905 | Wilmore | 141/68 X |
|---|---|---|---|
| 2,701,674 | 2/1955 | Christiansen | 141/171 X |
| 3,610,391 | 10/1971 | Beck | 198/562 |
| 3,800,937 | 4/1974 | Tassie | 198/803.14 |
| 3,860,107 | 1/1975 | Cioni et al. | 198/803.15 X |
| 4,667,804 | 5/1987 | Dubuit et al. | 198/465.1 X |
| 5,441,146 | 8/1995 | Ziegler | 198/347.2 X |

FOREIGN PATENT DOCUMENTS

| 553161 | 2/1958 | Canada | 141/129 |
|---|---|---|---|
| 3918072 | 12/1990 | Germany . | |

*Primary Examiner*—J. Casimer Jacyna
*Attorney, Agent, or Firm*—Edwin E. Greigg; Ronald E. Greigg

[57] ABSTRACT

An apparatus for transporting containers intermittently. The apparatus has two guide rails which extend in a horizontal plane. Container carriers, which have receiving elements for the containers are disposed on the guide rails. The container carriers are fed by means of gearing embodied on them and transport gears embodied on the guide rails. Transfer devices and format changer devices are disposed on the ends of the guide rails. The output of the apparatus can be increased by subdividing it into continuous and intermittent feed zones.

26 Claims, 5 Drawing Sheets

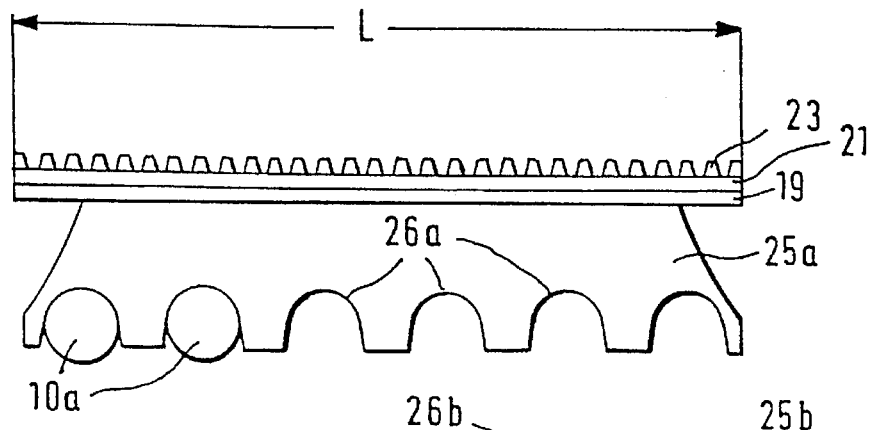
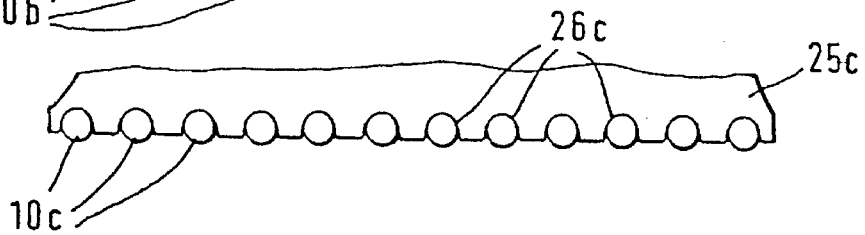
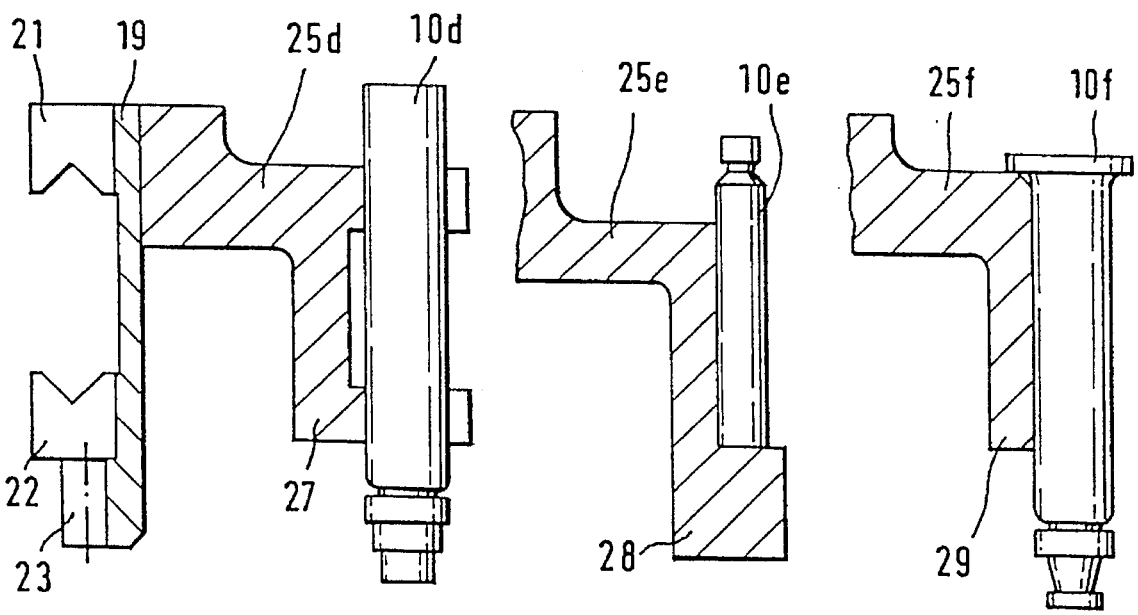

1

APPARATUS FOR TRANSPORTING CONTAINERS INTERMITTENTLY

BACKGROUND OF THE INVENTION

The invention is based on an apparatus for transporting containers intermittently as set forth hereinafter. German Patentschrift 28 53 103 discloses an apparatus of this kind for supplying containers to a filling station, in which apparatus the carriers are lined up one after the other on two guide tracks which are disposed one above the other; the containers are supplied to the carriers on the lower guide track and after they are transferred to the upper guide track, are filled at the filling station. For transferring the carriers, a transfer device with a pivot arm is disposed on each of the two ends of the guide track, which pivot arm transfers the arriving carriers from the upper guide track to the lower guide track or vice versa. To achieve this, the pivot arm swings each carrier out from the first guide track, rotates it on an axis parallel to the feed direction and then sets it onto the second guide track at a 90° tilt. The known apparatus has the disadvantage that processing stations can only be disposed along the upper guide track so that the arrangement of several processing stations is limited to the length of the upper guide track. That is why in order to realize several processing steps, the upper guide track is constructed as very long, which causes the known apparatus to require a large amount of space. Furthermore, at each machine cycle, the containers are shifted further by a step so that the machine cycle, and consequently the capacity of the apparatus, depends upon the longest processing time. The capacity of the known apparatus is therefore relatively low.

ADVANTAGES OF THE INVENTION

The apparatus according to the invention has an advantage over the prior art that processing stations can be associated with both the advance track and the return track, which allows the apparatus according to the invention to be constructed in a particularly compact and simple manner. Furthermore, because of the kinematics of the transfer device relative to the container carriers, these are always supplied in the same direction so that in the formation, they each bump against the same side of the neighboring container carrier. It is possible to constitute intermittent and continuous feed regions by means of the gearing disposed on the container carriers in connection with several transport gears disposed on the advance and return tracks. Hence the processing times of the processing stations can be lengthened in the continuous feed zones without leading to pauses in the processing zones in the intermittent feed zones. Consequently, when there are processing stations with differing processing times, the output of the apparatus according to the invention is particularly high. By the disposition of at least one format changer device for the container carriers on a transfer device, a fully automated change of format can be executed.

Further advantages of the apparatus according to the invention will become more apparent from the claims and the description.

DRAWING

Exemplary embodiments of the invention are shown in the drawing and are further explained below.

FIG. 4 shows a top view of a container carrier for receiving a plurality of containers;

FIGS. 5 and 6 show top views of container carriers for containers having formats that differ from FIG. 4;

FIGS. 7–9 show cross sections of container carriers for various containers;

Figure 1:
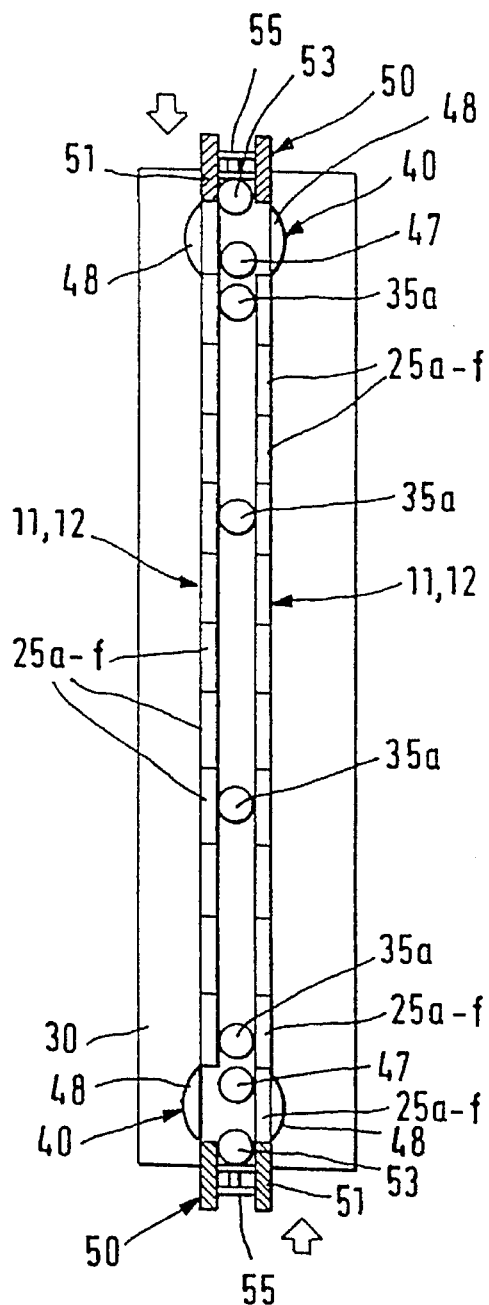
FIG. 1 shows a simplified top view of an apparatus for the intermittent transport of containers.
Figure 2:
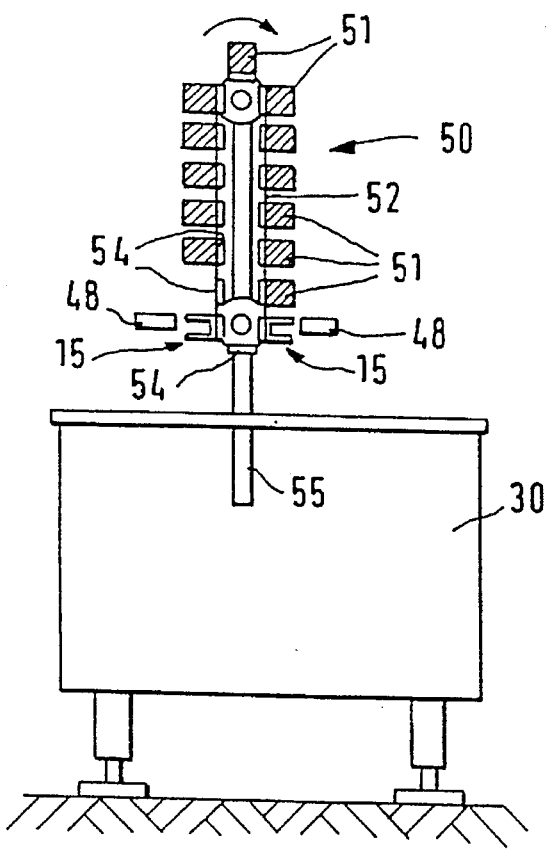
FIG. 2 shows a simplified front view of the apparatus according to FIG. 1.
Figure 3:
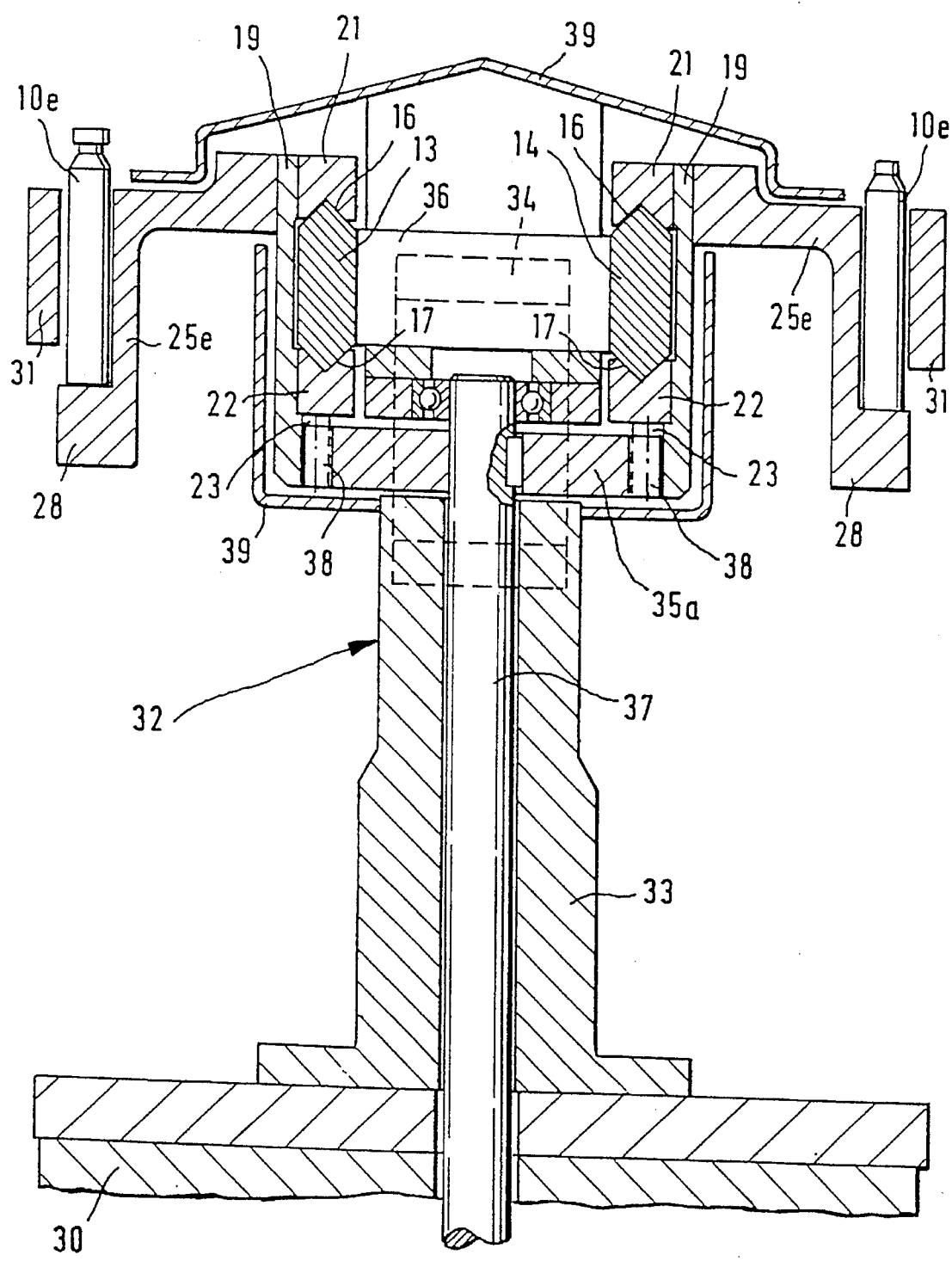
FIG. 3 shows a cross section of a carrier for guide rails.
Figure 10:
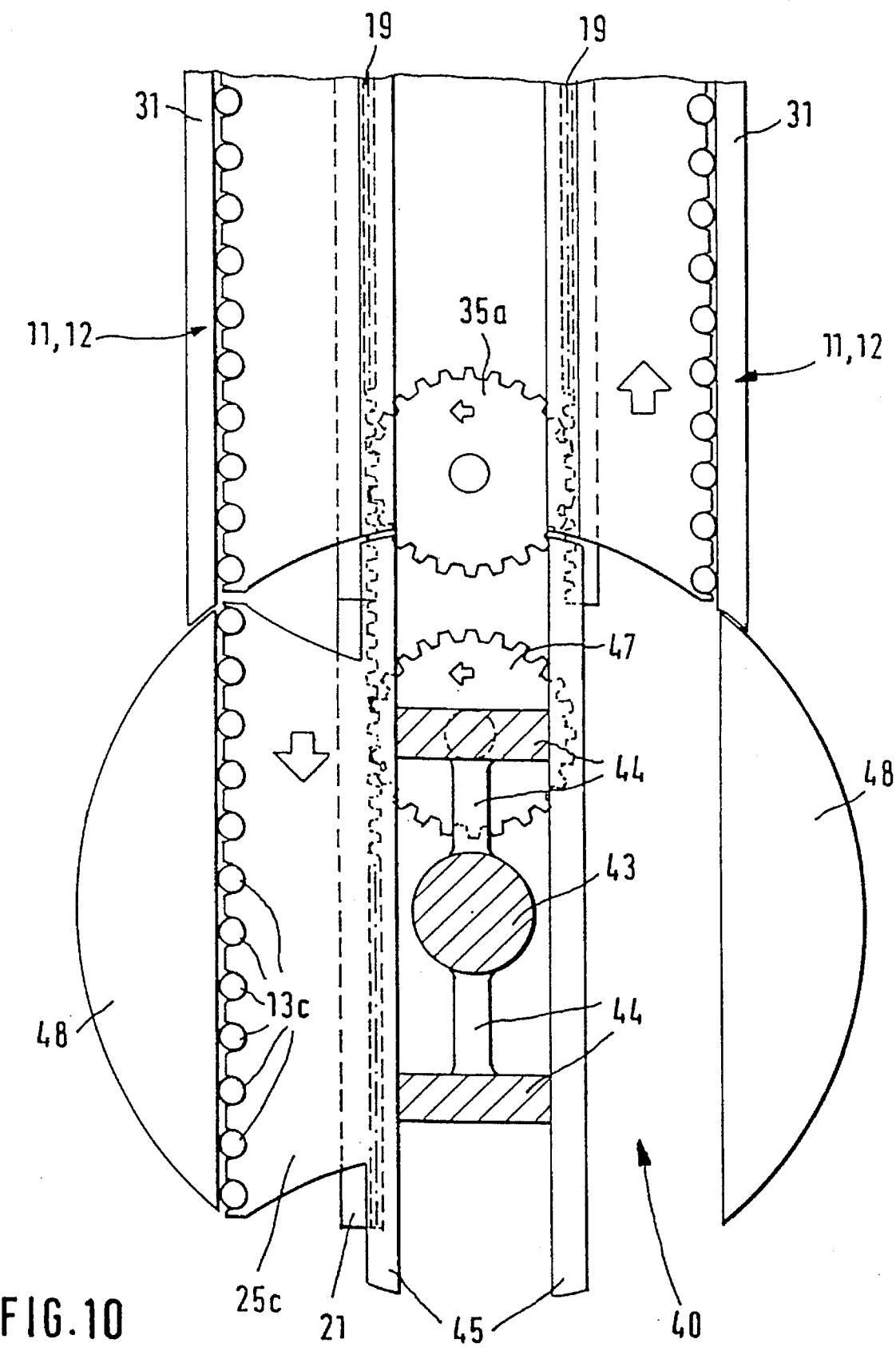
FIG. 10 shows a top view of a transfer apparatus having guide rails.
Figure 11:
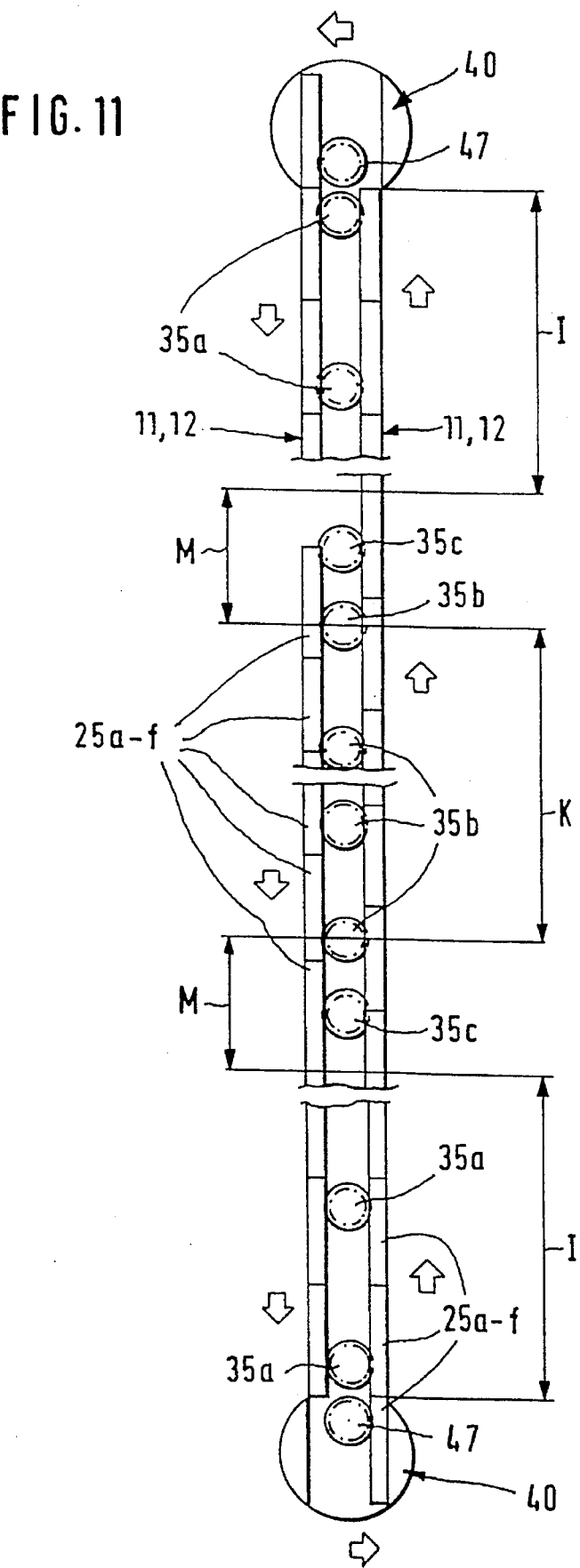

and FIG. 11 shows a simplified top view of an apparatus of FIG. 1 in a modified form.

DESCRIPTION OF THE EXEMPLARY EMBODIMENTS

The apparatus for the intermittent supply of containers $10a$–$10f$ to processing stations, having filling and closing apparatuses, has two straight transport tracks 11, 12 in a horizontal plane for the advance and return, each having a guide rail 13, 14. The guide rails 13, 14, upon which container carriers 15 can be slid, have a flat, hexagonal cross sectional surface. The container carriers 15 are comprised of a plate-shaped carrier plate 19, to which are attached two spaced track guides 21, 22, which are embodied having wedge-shaped grooves on their sides oriented toward the guide rails 13, 14, which form fittingly enclose the upper and lower edges of the guide rails 13, 14, which are embodied as wedge-shaped. Below the lower track guide 22, a linear gearing in the form of a rack 23 is disposed on each carrier plate 19, which linear gearing serves to transport of the container carriers 15 on the guide rails 13, 14. A receptacle element $25a$–$25f$ is attached to each carrier plate 19 on the side remote from the guide rails 13, 14. Depending upon number and format of the containers $10a$–$10f$ to be supplied, the receptacle elements $25a$–$25f$ have for example six, eight, or twelve recesses $26a$–$26c$ (FIGS. 4–6), which are embodied spaced equidistantly in the receptacle elements $25a$–$25f$ so that the length of the receptacle elements $25a$–$25f$ is always the same and essentially corresponds to the length L of a carrier plate 19. Depending on the intended use and embodiment of the containers $10a$–$10f$, the receptacle elements $25d$–$25f$ can be used for clamped, supported, or suspended transport of containers $10a$–$10f$, for example by means of clamps 27 or steps 28, 29 (FIGS. 7–9).

To protect the containers $10a$–$10f$ against laterally falling out of the recesses $26a$–$26c$ during transport, track guides 31 which adjoin the transport tracks 11, 12 are disposed parallel to the guide rails 13, 14. The guide rails 13, 14 are attached to carriers 32, which are disposed on a table 30, which holds the entire drive and control of the apparatus according to the invention. The carriers 32 have a column-shaped base 33, on whose upper region a transverse arm 36 is attached via a U-shaped angled piece 34, which transverse arm 36 on each side carries one of the guide rails 13, 14. Below the transverse arm 36, there is a transport gear $35a$, which is driven by means of a shaft 37, which is guided by the base 33. The diameter of the transport gear $35a$ is calculated so that with its gearing 38, it simultaneously engages the racks 23 of two container carriers 15, which are on opposite sides of the guide rails 13, 14, so that when the transport gear $35a$ turns, the one container carrier 15 is shifted in the one direction and simultaneously, the other container carrier 15 is shifted in the opposite direction, each on the respective guide rail 13, 14. To protect against soiling, the upper region of the carrier 32 is covered with a sheath 39.

In the event that container carriers 15 on the apparatus are advanced solely intermittently, two carriers 32 having corresponding transport gears 35a, which are cyclically and synchronously driven already prove to be sufficient. In this case, the carriers 32 are disposed at the respective ends of the guide rails 13, 14. The individual container carriers 15 are shifted further in the formation on the respective guide rails 13, 14 by the container carriers 15 now in the region of both of the transport gears 35. In order to reduce the forces on the transport gears 35a, however, depending on the length of the guide rails 13, 14, as a rule, more than two carriers 32 are disposed having transport gears 35a between the guide rails 13, 14, which are likewise all cyclically and synchronously driven.

A transfer device 40 adjoins both ends of the guide rails 13, 14. The transfer devices 40 each pick up a container carrier 15 from one of the guide rails 13, 14, rotate it 180° in the plane of the guide rails 13, 14, and deposit it on the other of the guide rails 13, 14. Since both of the transfer devices 40 rotate in the same direction, for example counterclockwise, a revolving operation of the container carriers 15 on the guide rails 13, 14 is achieved.

Each of the transfer devices 40 is rotatably supported on an axle 43 and has two rail sections 45 for the container carriers 15, which sections 45 are disposed opposite from each other and are connected to the axle 43 via struts 44. The rail sections 45, whose length is a little greater than the length L of the carrier plate 19 of the container carriers 15, have the same cross sectional surface as the guide rails 13, 14 and are disposed spaced apart by the same distance as them so that for picking up or depositing container carriers 15, both rail sections 45 directly adjoin the guide rails 13, 14. For transferring a container carrier 15 from one of the guide rails 13, 14 to a transfer device 40 and vice versa, a stationary transfer gear 47 is disposed between the rail sections 45 of each transfer device 40, between its axle 43 and the guide rails 13, 14, which transfer gear 47 is driven by a drive disposed in the table 30. To protect the containers 10a–10f from falling off of the container carriers 15, guide plates 48 in the shape of segments of a circle are disposed on the transfer devices 40 in the extension of the track guides 31.

Near the transfer devices 40, format changer apparatuses 50 adjoin the sides remote from the guide rails 13, 14. In a change of format, with the help of the format changer apparatuses 50, container carriers 15, each having identical receptacle elements 25a–25f for various container formats, are taken off the guide rails 13, 14 and stored in a magazine; when a change is made back to the original container format, they are put back again. The container carriers 15 are stored in storage locations 51 in the format changer apparatus 50; the receptacles 54 of these storage locations 51 are embodied for example like the rail sections 45 of the transfer devices 40. The individual storage locations 51, each of which stores a container carrier 15, are connected to one another with a belt or a chain 52 in the form of a belt or chain feeder embodied perpendicular to the apparatus, which feeder is attached to the table 30 by a column 55. The arrangement of the storage locations 51 on the belt or chain feeder is chosen so that a storage location 51 is disposed in the extension of each of the two receiving rails 45 of a transfer device 40. To pick up and deposit container carriers 15, a stationary format gear 53 is disposed between two storage locations 51 in the format changer device 50. In a change of format, the format gear 53, which has the same diameter as the transfer gears 47 and the transport gears 35a, carries out the removal of a container carrier 15 from a first rail section 45 of a transfer device 40 into the format changer device 50, while at the same time depositing a container carrier 15 for another container format from the format changer device 50 onto the second rail section 45 of the transfer device 40. Once the process is completed, the storage locations 51 are moved further, for example clockwise, by means of a drive, not shown, for the belt or chain feeder, to a position in order to pick up and deposit the next container carriers 15. During the format changer process, the rail sections 45 of the transfer devices 40 are not rotated around the axle 43, but rather stay in the extension of the guide rails 13, 14. The transfer gear 47 of the transfer device 40 is simply driven in the same direction, synchronous to the transport gears 35a.

It is additionally noted that in each of the two format changer devices 50, at least half of the storage locations 51 should be intended for container carriers 15 of a single format. It is also possible, though, by means of a corresponding increase of the number of storage locations 51 to store for example one or several complete format sizes in one of the format changer devices 50 and to have them available by means of an appropriate control. It is also conceivable to simply provide a storage capacity appropriate to the format changer device 50, on one end of the apparatus.

When the apparatus is operated intermittently (FIG. 1), the length of the guide rails 13, 14 advantageously comes to a multiple of the length L of a container carrier 15. To fully exploit the capacity of the apparatus, both guide rails 13, 14 are furthermore completely occupied by container carriers 15, and a container carrier 15 is disposed in the transfer devices 40 in the extension of each of the guide rails 13, 14.

The transport gears 35a as well as the transfer gears 47 are synchronously driven in the same rotation direction, for example counterclockwise, and are each driven by the same angular magnitude. The smallest meaningful feed cycle effects the further transport of the container carriers 15 by one container 10a–10f, which is disposed on the container carrier 15. This can be necessary, for example, if only one container 10a–10f at a time can be closed at a closing station. The greatest possible feed cycle effects the further transport of the container carrier 15 by its length L. The greatest possible feed cycle is limited in that each of the transfer devices 40 can only pick up one container carrier 15 at time. Once a container carrier 15 has been completely fed into a transfer device 40 by one of the guide rails 13, 14, the feeding of container carriers 15 onto the guide rails 13, 14 is discontinued during the time while this container carrier 15 is transferred from the one to the other guide rail 13, 14. After the container carrier 15 is rotated in the transfer device 40 around the axle 43 by an angle of 180°, it is released onto the other guide rail 13, 14 while maintaining its original direction of movement, while the transfer gear 47 and the transport gears 35a are driven once again.

In a modification of solely intermittent feeding of container carriers 15, additional continuous feed zones K are created in the apparatus according to FIG. 11. In these zones K, the processing stations are moved with the container carriers 15, while in the intermittent feed zones I, the processing stations are disposed stationarily on the apparatus and the container carriers 15 are supplied to them intermittently. Hence, the processing stations in the continuous feed zones K can be lengthened regardless of the processing times of other processing stations, without leading to pauses in the intermittent feed zones I, thus increasing the overall output of the apparatus.

Unlike the intermittent feeding, the guide rails 13, 14 according to FIG. 11 are not completely loaded with container carriers 15. Furthermore, in the continuous feed zone K, transport gears 35b are disposed between the guide rails 13, 14, which gears 35b are continuously driven having a constant angular velocity, and in a transition zone M, transport gears 35c execute either an accelerating or a decelerating rotation movement depending on which of the guide rails 13, 14 is feeding it a container carrier 15. If, for example, container carriers 15 go from the intermittent zone I into the continuous zone K, they are slowed down in a zone M and adapted to the lower angular velocity of the transport gears 35b in the continuous zone K by means of the transport gears 35c. Upon reentry into an intermittent feed zone I, the transport gears 35c take the container carriers 15 from the continuous feed zone K and adapt them to the motion of the gears 35a of the intermittent zone I. Since the movement sequences of the two guide rails 13, 14 are mirror images of each other, and a transport gear 35c feeds container carriers 15 onto both guide rails 13, 14, but the demands on the kinematics of the transport gear 35c for containers on the two guide rails 13, 14 are different, only one container carrier 15 is disposed in the engagement range of each transport gear 35c.

It is additionally emphasized that the apparatus according to the invention can be adapted by the creation of additional intermittent or continuous feed zones to the processing stations so that its flexibility and output is increased when there are several consecutively running processing steps of differing processing times. It is furthermore possible to buffer several container carriers 15 in the continuous feed zones K, which carriers are then brought jointly in formation into an intermittent feed zone I by means of appropriately triggered transport gears. In this way, the available processing times for this formation can be increased in the intermittent zone I, which can likewise increase the output of the apparatus.

The foregoing relates to preferred exemplary embodiments of the invention, it being understood that other variants and embodiments thereof are possible within the spirit and scope of the invention, the latter being defined by the appended claims.

What is claimed is:

1. An apparatus for transporting containers intermittently to at least one processing station, said apparatus comprising several container carriers (15), connected to each other in a feed and return loop, said container carriers receive the containers (10a–10f) at a receiving end for transport to a transfer end, two parallel spaced guide rails (13, 14) support said container carriers for an advance of said container carriers to said transfer end of the feed loop, and return of container carriers (15) back to said receiving end of the feed loop, and transfer devices (40), which are disposed on an end of said rails (13, 14), for the container carriers (15), the guide rails (13, 14) extend in a horizontal plane for guiding said container carriers, and rail sections (45) are embodied on the transfer devices (40) for the container carriers (15), said rail sections (45) are rotated around an axle (43) disposed perpendicular to the feed direction of the container carriers (15), and that the container carriers (15) have a linear gearing (23) extending in their feed direction, which gearing (23) engages transport gears (35a–35c) disposed relative to the guide rails (13, 14).

2. The apparatus according to claim 1, in which several transport gears (35a–35c), which are driven independently of one another, are disposed along the guide rails (13, 14) to transport the container carriers (15), and that the guide rails (13, 14) have at least one zone (K) in which the container carriers (15) are continuously fed.

3. The apparatus according to claim 2, in which the diameter of the transport gears (35a–35c) is adapted to the space between the guide rails (13, 14) so that the transport gears (35a 35c) disposed between them simultaneously feed container carriers (15) onto both guide rails (13, 14).

4. The apparatus according to claim 3, in which a format changer device (50) for the container carriers (15) is disposed relative to one transfer device (40).

5. The apparatus according to claim 2, in which a format changer device (50) for the container carriers (15) is disposed relative to at least one transfer device (40).

6. The apparatus according to claim 2, in which the container carriers (15) have recesses (26a–26c) and receptacles (27–29) adapted to the format and number of the containers (10a–10f).

7. The apparatus according to claim 2, in which a length of the guide rails (13, 14) is a multiple of a breadth (L) of one container carrier (15).

8. The apparatus according to claim 2, in which the guide rails (13, 14) have opposite sides (17), which are embodied as wedge-shaped and which engage track guides (21, 22) of the container carriers (15), and said track guides (21, 22) are embodied as correspondingly wedge-shaped.

9. The apparatus according to claim 1, in which the diameter of the transport gears (35a–35c) is adapted to the space between the guide rails (13, 14) so that the transport gears (35a 35c) disposed between them simultaneously feed container carriers (15) onto both guide rails (13, 14).

10. The apparatus according to claim 9, in which a format changer device (50) for the container carriers (15) is disposed relative to at least one transfer device (40).

11. The apparatus according to claim 9, in which the container carriers (15) have recesses (26a–26c) and receptacles (27–29) adapted to the format and number of the containers (10a–10f).

12. The apparatus according to claim 9, in which a length of the guide rails (13, 14) is a multiple of a breadth (L) of one container carrier (15).

13. The apparatus according to claim 9, in which the guide rails (13, 14) have opposite sides (17), which are embodied as wedge-shaped and which engage track guides (21, 22) of the container carriers (15), and said track guides (21, 22) are embodied as correspondingly wedge-shaped.

14. The apparatus according to claim 1, in which a format changer device (50) for the container carriers (15) is disposed relative to at least one transfer device (40).

15. The apparatus according to claim 14, in which the format changer device (50) is disposed near the transfer device (40) on a side remote from the guide rails (13, 14).

16. The apparatus according to claim 15, in which the container carriers (15) have recesses (26a–26c) and receptacles (27–29) adapted to the format and number of the containers (10a–10f).

17. The apparatus according to claim 15, in which a length of the guide rails (13, 14) is a multiple of a breadth (L) of one container carrier (15).

18. The apparatus according to claim 15, in which the guide rails (13, 14) have opposite sides (17), which are embodied as wedge-shaped and which engage track guides (21, 22) of the container carriers (15), and said track guides (21, 22) are embodied as correspondingly wedge-shaped.

19. The apparatus according to claim 14, in which the container carriers (15) have recesses (26a–26c) and receptacles (27–29) adapted to the format and number of the containers (10a–10f).

20. The apparatus according to claim 14, in which a length of the guide rails (13, 14) is a multiple of a breadth (L) of one container carrier (15).

21. The apparatus according to claim 14, in which the guide rails (13, 14) have opposite sides (17), which are embodied as wedge-shaped and which engage track guides (21, 22) of the container carriers (15), and said track guides (21, 22) are embodied as correspondingly wedge-shaped.

22. The apparatus according to claim 1, in which the container carriers (15) have recesses (26a–26c) and receptacles (27–29) adapted to the format and number of the containers (10a–10f).

23. The apparatus according to claim 22, in which the guide rails (13, 14) have opposite sides (17), which are embodied as wedge-shaped and which engage track guides (21, 22) of the container carriers (15), and said track guides (21, 22) are embodied as correspondingly wedge-shaped.

24. The apparatus according to claim 1, in which a length of the guide rails (13, 14) is a multiple of a breadth (L) of one container carrier (15).

25. The apparatus according to claim 24, in which the guide rails (13, 14) have opposite sides (17), which are embodied as wedge-shaped and which engage track guides (21, 22) of the container carriers (15), and said track guides (21, 22) are embodied as correspondingly wedge-shaped.

26. The apparatus according to claim 1, in which the guide rails (13, 14) have opposite sides (17), which are embodied as wedge-shaped and which engage track guides (21, 22) of the container carriers (15), and said track guides (21, 22) are embodied as correspondingly wedge-shaped.

* * * * *